(12) United States Patent
Hosono

(10) Patent No.: US 8,467,832 B2
(45) Date of Patent: Jun. 18, 2013

(54) MOBILE COMMUNICATION METHOD AND SERVER DEVICE

(75) Inventor: Hiroyuki Hosono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 54 days.

(21) Appl. No.: 13/058,108

(22) PCT Filed: Aug. 7, 2009

(86) PCT No.: PCT/JP2009/064036
§ 371 (c)(1),
(2), (4) Date: May 9, 2011

(87) PCT Pub. No.: WO2010/016578
PCT Pub. Date: Feb. 11, 2010

(65) Prior Publication Data
US 2011/0212716 A1    Sep. 1, 2011

(30) Foreign Application Priority Data
Aug. 8, 2008    (JP) .................................. 2008-206186

(51) Int. Cl.
H04M 1/00 (2006.01)
(52) U.S. Cl.
USPC ............................ 455/561; 455/423; 455/555
(58) Field of Classification Search
USPC .................................. 455/423, 424, 561, 555
See application file for complete search history.

(56) References Cited

U.S. PATENT DOCUMENTS

| 6,795,689 B1 * | 9/2004 | Ogren et al. | ................ 455/67.13 |
| 2004/0017783 A1 * | 1/2004 | Szentesi et al. | ................ 370/256 |
| 2006/0223533 A1 | 10/2006 | Sakata | |
| 2007/0097938 A1 | 5/2007 | Nylander et al. | |
| 2009/0181709 A1 | 7/2009 | Shimomura et al. | |

FOREIGN PATENT DOCUMENTS

| JP | 2003-174665 | 6/2003 |
| JP | 2007-306591 A | 11/2007 |
| WO | 2004 093481 | 10/2004 |
| WO | 2007 040451 | 4/2007 |
| WO | 2007 125583 | 11/2007 |
| WO | WO 2007/142076 A1 | 12/2007 |

OTHER PUBLICATIONS

"3 GPP TSG RAN #35, Requirements for LTE Home eNodeBs", RP-070209, Agenda item 10.19, Discussion & Decision, Orange, Telecom Italia, T-Mobile, Vodafone, Total pp. 4, (Mar. 6-9, 2007).
International Search Report issued Nov. 10, 2009 in PCT/JP09/064036 filed Aug. 7, 2009.
Office Action issued Jun. 26, 2012 in Japanese Patent Application No. 2010-523898 with English language translation.
Japanese Office Action issued Oct. 2, 2012, in Japan Patent Application No. 2010-523898 (with English translation).

* cited by examiner

Primary Examiner — Vladimir Magloire
(74) Attorney, Agent, or Firm — Oblon, Spivak, McClelland, Maier & Neustadt, L.L.P.

(57) ABSTRACT

A mobile communication method according to the present invention includes step of determining to change a manager of a radio base station from a first network device to a second network device, step of notifying the first network device and the second network device of the determination result, step of transmitting a reset request to the radio base station, step of performing reset operation by the radio base station, step of notifying the radio base station of address information of the second network device and step of connecting to the second network device by the radio base station using the notified address information.

6 Claims, 7 Drawing Sheets

MOBILE COMMUNICATION METHOD AND SERVER DEVICE

TECHNICAL FIELD

The present invention relates to a mobile communication method and a server device.

BACKGROUND ART

Generally, in order to respond to connection requests occurring at random from a mobile station, a network administrator constantly maintains and operates a macro-cell radio base station providing a public communication service.

The network administrator normally decides a macro-cell radio base station continuously under management of a radio network controller when installation. However, in a situation in which traffic is concentrated in a specific radio network controller, the network administrator changes macro-cell radio base stations under management of the radio network controller to distribute the traffic to be processed by the radio network controller.

For example, the network administrator changes the macro-cell radio base stations under management of the radio network controller as follows.

(1) The network administrator searches for a radio network controller that manages a neighboring radio base station of the macro-cell radio base station. If a plurality of such radio network controllers exist, the traffic amount of each of the radio network controllers is evaluated to determine which radio network controller to manage the macro-cell radio base station.

(2) The network administrator directly and manually reflects in configuration data various parameters of the macro-cell radio base station and the radio network controller to be changed (including address information of the macro-cell radio base station or the radio network controller), and sets the configuration data to the macro-cell radio base station.

(3) The network administrator performs a reset operation on the macro-cell radio base station to be changed, and reconnects the macro-cell radio base station to the radio network controller of the new connection destination.

SUMMARY OF THE INVENTION

Problem to be Solved by the Invention

In recent years, considerations have been made on an operation method for a radio base station called a femto-cell radio base station (Home eNB) installed in a small area such as a home.

Such a femto-cell radio base station is assumed to be installed by the owner thereof and a huge number of femto-cell radio base stations are expected to be installed. Thus, there have been problems that a network administrator has to make a great amount of parameter settings as in (1) and (2) described above, and that the owners of the femto-cell radio base stations are forced to perform the maintenance operation (reset operation) as in (3) described above.

The present invention is made in view of the above and an objective of the present invention is to provide a mobile communication method and a server device that allows an automatic manager change of a femto-cell radio base station without forcing the owner of the femto-cell radio base station to perform a maintenance operation (reset operation) while preventing an increase in work for a parameter setting operation by a network administrator.

The first feature of the present invention is summarized in that a mobile communication method comprising step A of determining to change a manager of a radio base station from a first network device to a second network device; step B of transmitting a reset request to the radio base station; step C of performing a reset operation by the radio base station in response to the reset request; step D of notifying the radio base station of address information of the second network device; and step E of establishing connection with the second network device by the radio base station using the notified address information of the second network device, wherein in the step C, the radio base station gradually lowers transmission power for broadcast information upon receiving the reset request and performs the reset operation after the transmission power for the broadcast information is lowered to a predetermined value if the radio base station is a first radio base station, and in the step C, the radio base station performs the reset operation upon receiving the reset request if the radio base station is a second radio base station.

The second feature of the present invention is summarized in that a server device comprising: a determination unit configured to determine a radio base station of which a manager is to be changed to a second network device in accordance with a service area of the second network device, and an installed position of each radio base station managed by a first network device when the second network device is newly installed in a service area of the first network device; and a transmission unit configured to transmit a reset request to the radio base station.

BRIEF DESCRIPTION OF THE DRAWINGS

FIG. 1 is an overall configuration view of a mobile communication system according to a first embodiment of the present invention.

FIG. 2 is a functional block diagram of a PnP server according to the first embodiment of the present invention.

FIG. 3 is a diagram showing an example of disposed states of network devices and a femto-cell radio base station according to the first embodiment of the present invention.

FIG. 4 is a diagram showing an example of a managed state of the femto-cell radio base station in the network devices according to the first embodiment of the present invention.

FIG. 5 is a sequence diagram showing an operation of the mobile communication system according to the first embodiment of the present invention.

FIG. 6 is a diagram for explaining managers of a macro-base station and femto-cell radio base stations in the mobile communication system according to the first embodiment of the present invention.

FIG. 7 is another diagram for explaining managers of a macro-base station and femto-cell radio base stations in the mobile communication system according to the first embodiment of the present invention.

FIG. 8 is yet another diagram for explaining managers of a macro-base station and femto-cell radio base stations in the mobile communication system according to the first embodiment of the present invention.

MODES FOR CARRYING OUT THE INVENTION (Configuration of Mobile Communication System According to First Embodiment of Present Invention)

A configuration of a mobile communication system according to a first embodiment of the present invention is described with reference to FIG. 1 to FIG. 4.

Figure 1:
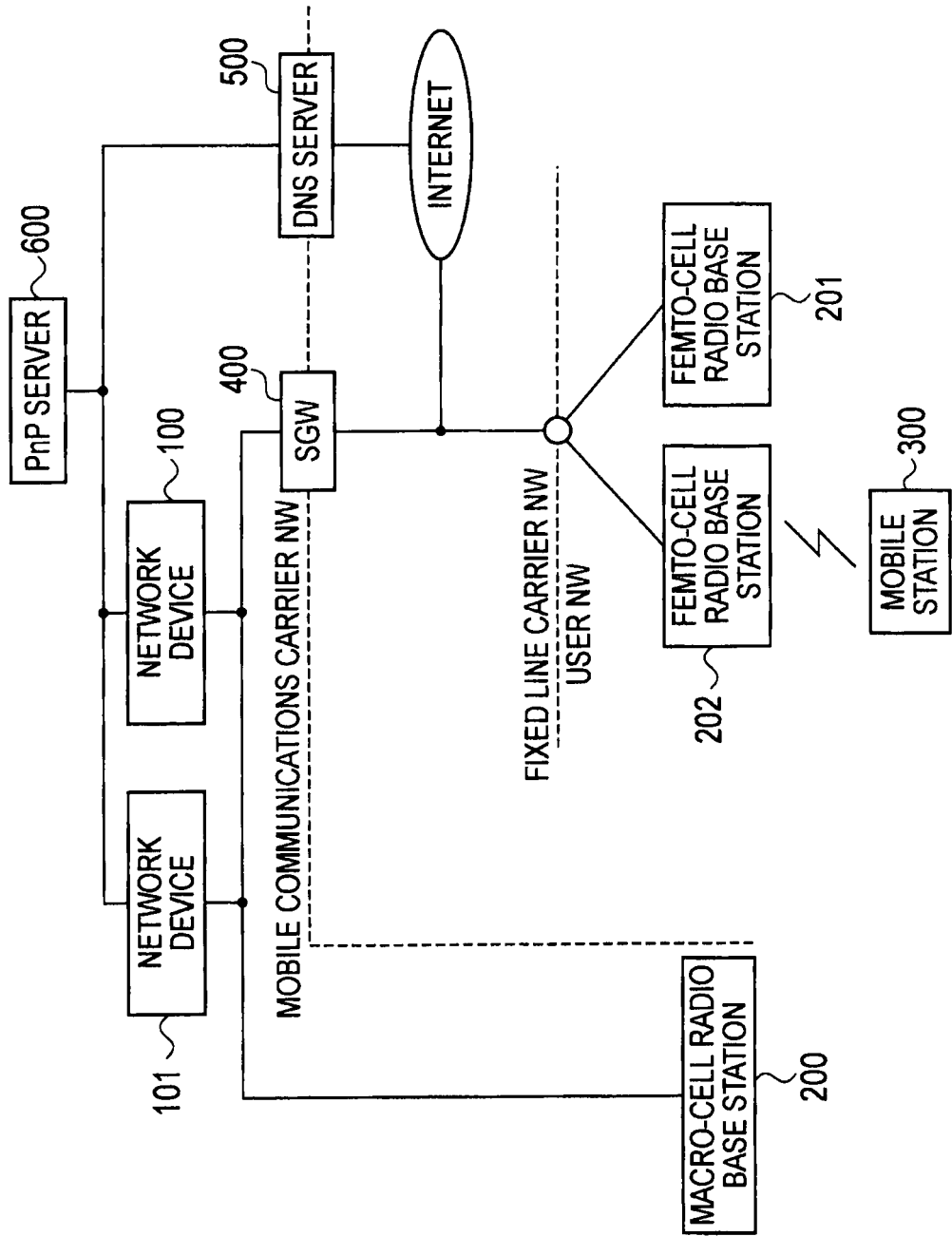
[FIG. 1]

As shown in FIG. 1, the mobile communication system according to this embodiment includes a first network device 100, a second network device 101, a gateway device (SGW: Security Gateway) 400, a DNS (Domain Name System) server 500, a PnP (Plug & Play) server 600, a macro-cell radio base station 200, and femto-cell radio base stations 201, 202.

The macro-cell radio base station 200 and the femto-cell radio base stations 201, 202 are managed by the first network device 100 or the second network device 101.

The first network device 100 and the second network device 101 are configured to assign the macro-cell radio base station 200 and the femto-cell radio base stations 201, 202 an individual radio channel between the macro-cell radio base station 200 and the femto-cell radio base stations 201, 202 and a mobile station 300 that performs radio communications with the macro-cell radio base station 200 and the femto-cell radio base stations 201, 202 and manage the macro-cell radio base station 200 and the femto-cell radio base stations 201, 202.

For example, if the mobile communication system according to the present embodiment is a W-CDMA mobile communication system, the first network device 100 and the second network device 101 are formed of a radio network controller RNC. If the mobile communication system according to the present embodiment is an LTE (Long Term Evolution) mobile communication system, the first network device 100 and the second network device 101 are formed of an exchange MME or SGSN.

The first network device 100 and the second network device 101 may be formed of other devices.

The macro-cell radio base station 200 is a first radio base station installed in a mobile telecommunications carrier network managed by a mobile telecommunications carrier. The femto-cell radio base stations 201, 202 are second radio base stations installed in a user network (a network managed by a subscriber of the mobile telecommunications carrier) outside the mobile telecommunications carrier network.

For example, the femto-cell radio base stations 201, 202 are installed in a LAN (Local Area Network) managed by the subscriber. The femto-cell radio base stations 201, 202 are connected to the first network device 100 or the second network device 101 installed in the mobile telecommunications carrier network via a network (fixed line carrier network) of an access line carrier such as FTTH (Fiber To The Home) and ADSL (Asymmetric Digital Subscriber Line).

The gateway device 400 is installed on the border of the mobile telecommunications carrier network. The gateway device 400 is a gateway device that protects the mobile telecommunications carrier network from an unauthorized access from other networks. Thus, only an access determined to be legitimate in the authentication processing by the gateway device 400 reaches the mobile telecommunications carrier network.

In addition, the DNS server 500 and the PnP server 600 are installed in the mobile telecommunications carrier network.

The DNS server 500 is configured to notify address information (for example, IP address) of a new network device to manage the femto-cell radio base stations 201, 202 in response to an address resolution request from the femto-cell radio base stations 201, 202.

Figure 2:
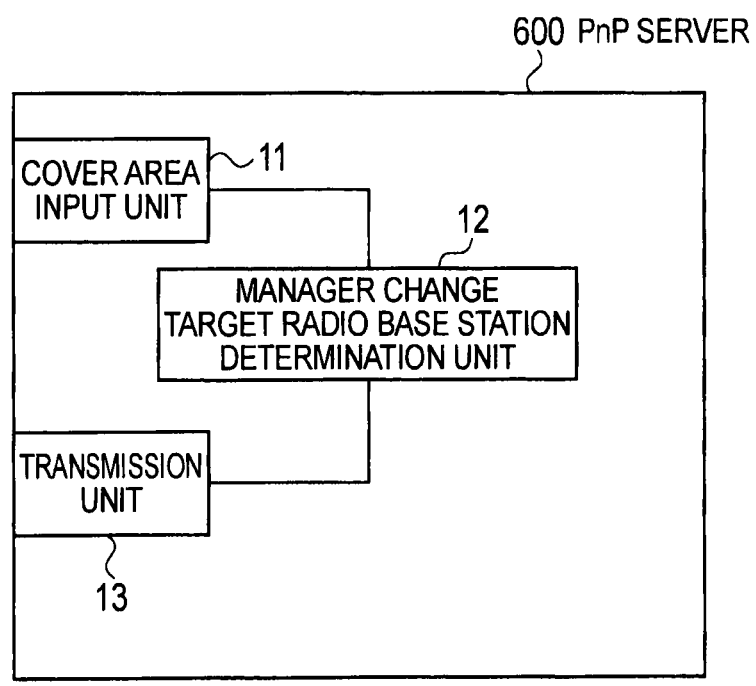
[FIG. 2]

As shown in FIG. 2, the PnP server 600 includes a cover area input unit 11, a manager change target radio base station determination unit 12, and a transmission unit 13.

The cover area input unit 11 is an input unit for a service area (cover area) of each network device. Here, the cover area represents a range of an area where radio base stations with installed positions included therein can be managed by each network device.

The manager change target radio base station determination unit 12 is configured to determine a radio base station (a macro-cell radio base station or a femto-cell radio base station) to be managed by a network device when the network device is newly installed.

Specifically, the manager change target radio base station determination unit 12 is configured to determine a radio base station of which the manager is changed to the second network device 102 in accordance with the service area of the second network device 101 and an installation position of the radio base station managed by the first network device 100, when the second network device 101 is newly installed in the service area of the first network device 100.

Figure 3:
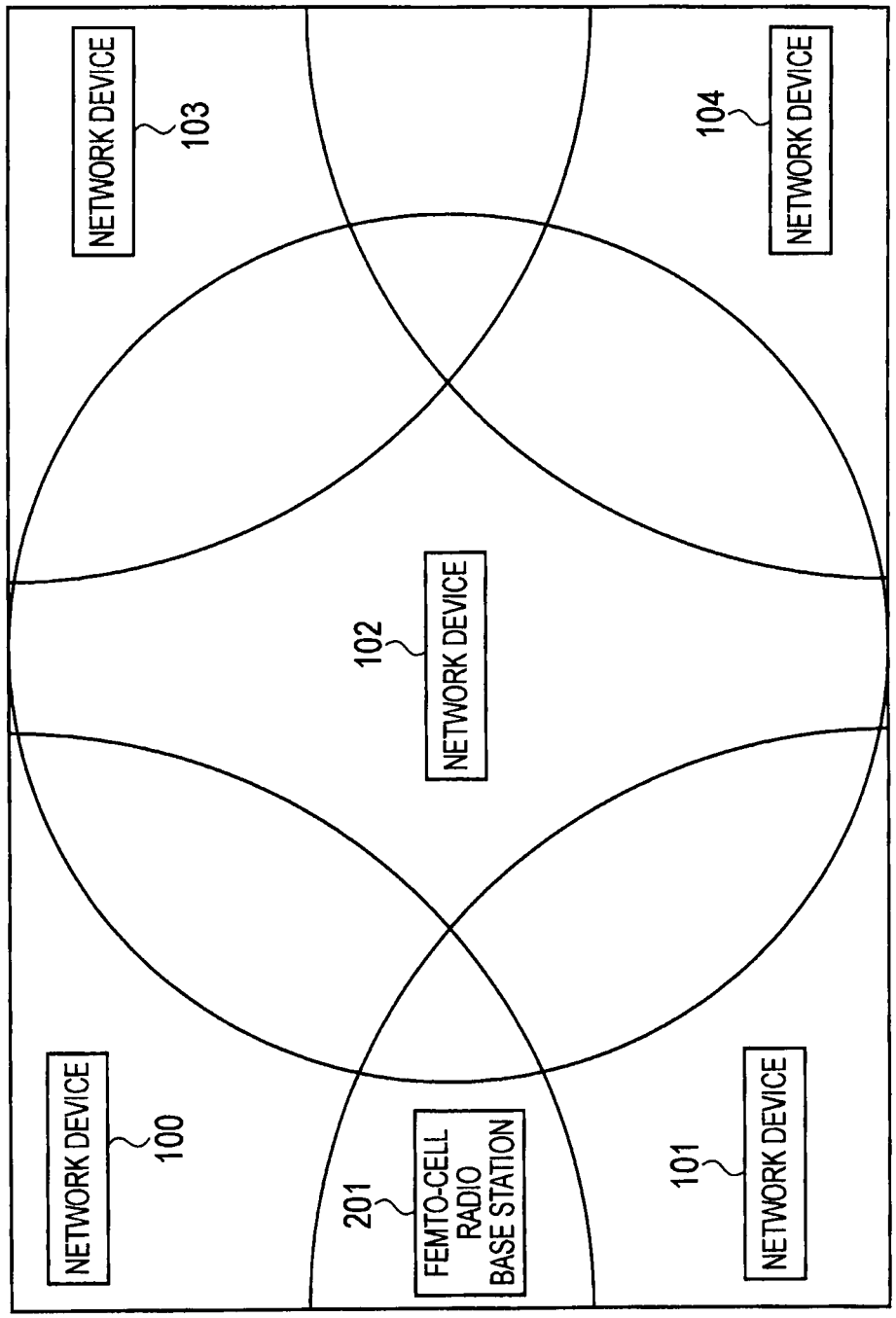
[FIG. 3]

For example, the manager change target radio base station determination unit 12 may determine to change a network device that manages the femto-cell radio base station 201 to the second network device 101 when the second network device 101 is newly installed in the service area of the first network device 100 because the femto-cell radio base station 201 is installed in the service area of the second network device 101 as shown in FIG. 3.

In addition, the manager change target radio base station determination unit 12 may be further configured to determine a radio base station of which the manager is changed to the second network device 101 in accordance with a type of each radio base station (whether each radio base station is a macro-cell radio base station or femto-cell radio base station).

Figure 4:
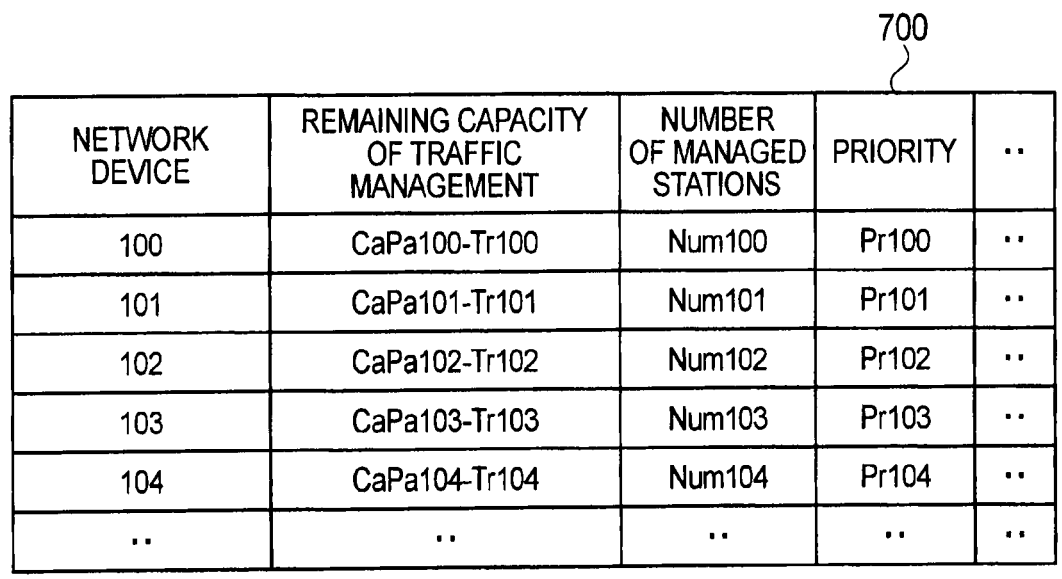
[FIG. 4]

Furthermore, the manager change target radio base station determination unit 12 may be configured to determine one network device to manage a radio base station by referring to a table shown in FIG. 4 when there is more than one network device that can manage the radio base station. Specifically, the determination can be made based on at least one of: the number of radio base stations that can be further managed by each of the network devices ("the number of managed stations"); mean, minimum, or maximum amount of remaining traffic that can be further managed by each of the network devices ("remaining capacity of traffic management"); and a priority assigned to each of the network devices.

The transmission unit 13 is configured to transmit the result of the determination made by the manager change target radio base station determination unit 12 to the first network device 100 and the second network device 101, and to transmit a reset request to the manager change target radio base station.

(Operation of Mobile Communication System According to First Embodiment of Present Invention)

Figure 5:
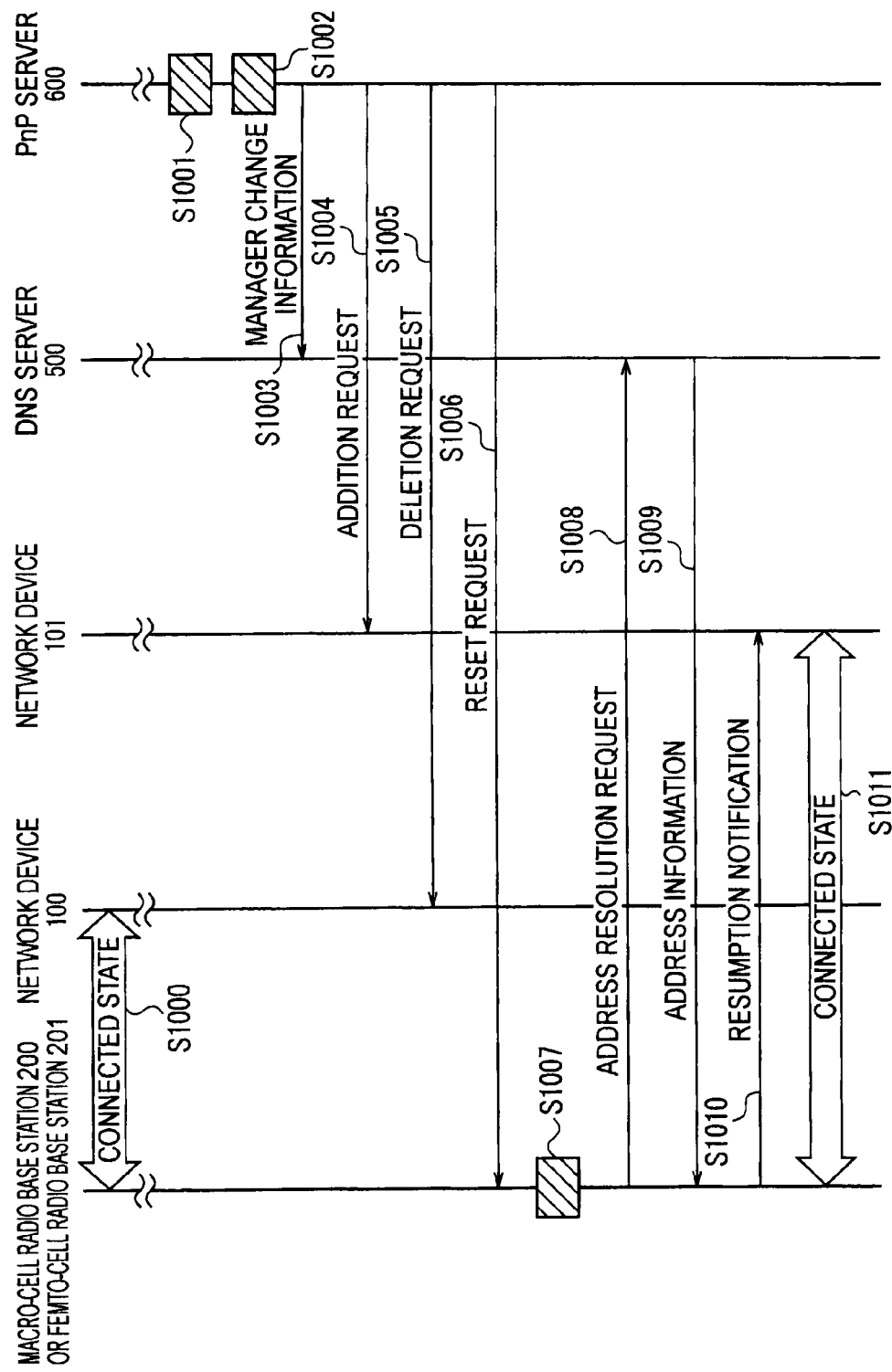
[FIG. 5]

An operation of the mobile communication system according to a first embodiment of the present invention is described with reference to FIG. 5.

Specifically, an operation for changing the manager of the femto-cell radio base station 201 to the second network device 101 is described with reference to FIG. 5 in a situation where the first network device 100 is managing the macro-cell radio base station 200 and the femto-cell radio base station 201.

Figure 6:
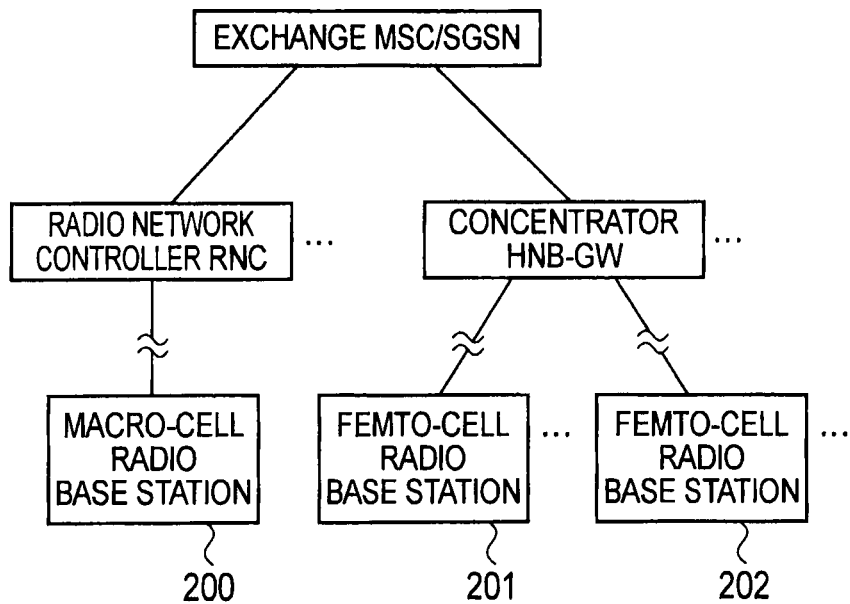
[FIG. 6]

As shown in FIG. 6, the femto-cell radio base station 201 is connected to the first network device 100 in step S1000.

In step S1001, the network administrator inputs a cover area of each of the network devices installed in the mobile communication network to the PnP server 600 to perform manager change on a radio base station due to the additional installation of the second network device 101 and the like.

In step S1002, the PnP server 600 refers to the installed position of the femto-cell radio base station 201 and the cover area of each of the network devices and determines the network device to manage the femto-cell radio base station 201.

Here, an operation of determining a network device to manage the femto-cell radio base station 201 in a case where cover areas of network devices 101 to 104 are input to the PnP server 600 is described with reference to FIG. 3 (this includes a determination of whether or not to change the manager of the femto-cell radio base station 201).

When the installation position of the femto-cell radio base station 201 is as shown in FIG. 3, the network device 100 to which the femto-cell radio base station 201 is currently connected and the network device 101 to which the femto-cell radio base station 201 is not connected are retrieved as manager network devices.

Here, the PnP server determines which of the network devices 100 and 101 should be the manager network device by referring to the criteria such as the "the number of managed stations," "remaining capacity of traffic management," and "priority" defined in the table shown in FIG. 4.

Note that, the PnP server may set the significance to each of the criteria. For example, the PnP server may give higher significance in the order of "remaining capacity of traffic management," "the number of managed stations," and "priority".

In such a case, if the "remaining capacity of traffic management" is "CaPa100-Tr100"-"CaPa101-Tr101">"Threshold1" in the example in FIG. 4, the PnP server determines that the network device 101 should be the manager without taking into consideration the other criteria, i.e., "the number of managed stations," and "priority".

Instep S1003, the PnP server 600 transmits manager change information including address information of the femto-cell radio base station 201 and the network device 101 to the DNS server 500, which is the transmission destination of the address resolution request of the femto-cell radio base station 201.

Note that, the DNS 500 manages the address information of the network device 101 in association with the address information of the femto-cell radio base station 201. Thus, the DNS 500 can select the address information of the network device 101 to be notified to the femto-cell radio base station 201 by referring to the address information of the transmission source of the address resolution request.

In step S1004, the PnP server 600 transmits an addition request including address information of the femto-cell radio base station 201 to the network device 101 to newly manage the femto-cell radio base station 201.

Note that, the network device 101 manages an operation parameter to be set to the femto-cell radio base station 201 in association with the address information of the femto-cell radio base station 201. The network device 101 selects the operation parameter to be set to the femto-cell radio base station 201 by referring to the address information of the transmission source of a resumption notification described later.

Meanwhile, in step S1005, the PnP server 600 transmits a deletion request for requesting the deletion of information such as the operation parameter set to the femto-cell radio base station 201 to the network device 100 that would no longer manage the femto-cell radio base station 201 due to the manager change.

The connection between the network device 100 and the femto-cell radio base station 201 is dissolved by the operation in step S1005.

In step S1006, the PnP server 600 transmits a reset request to the femto-cell radio base station 201 to make the femto-cell radio base station 201 again search for a network device to manage the femto-cell radio base station 201.

In step S1007, the femto-cell radio base station 201 that has received the reset request performs the reset operation.

The macro-cell radio base station is configured to gradually lower the transmission power for broadcast information upon receiving the reset request and perform the reset operation after the transmission power for the broadcast information is lowered to the predetermined value.

In step S1008, the femto-cell radio base station 201 transmits the address resolution request to the DNS server 500 after the assignment of address information (IP address for example) to the femto-cell radio base station 201, and if needed, the setting of VPN (Virtual Private Network) between the femto-cell radio base station 201 and the gateway device 400.

In step S1009, the DNS server 500 refers to the address information of the femto-cell radio base station 201, which is the transmission source of the received address resolution request, and notifies the femto-cell radio base station 201 of the address information of the network device 101 associated with the address information of the femto-cell radio base station 201.

In step S1010, the femto-cell radio base station 201 that has received the address information of the network device 101 to newly manage the femto-cell radio base station 201 transmits a signal for the resumption notification to the network device 101. Thus, the femto-cell radio base station 201 is notified of the operation parameter by the network device 101 to be connected to the network device 101.

Steps S1003 to S1006 as described above are in no particular order, and the order can be changed.

(Advantageous Effect of Mobile Communication System According to First Embodiment of Present Invention)

According to the mobile communication method according to the first embodiment of the present invention, the manager change of a femto-cell radio base station can be automatically performed without forcing the owner of the femto-cell radio base station perform the maintenance operation (reset operation) while preventing an increase in work for the parameter setting operation by the network administrator from increasing.

Here, managers of the macro-cell radio base station 200 and the femto-cell radio base stations 201, 202 in the mobile communication system according to the embodiment are described with reference to FIG. 6 to FIG. 8.

Firstly, as shown in FIG. 6, the mobile communication system according to the present embodiment may be so configured that the macro-cell radio base station 200 is managed by a radio network controller RNC, which is a type of a network device, and the femto-cell radio base stations 201, 202 are managed by a concentrator HNB-GW, which is a type of a network device.

Here, the femto-cell radio base stations 201, 202 may be managed by the radio network controller RNC instead of the concentrator HNB-GW.

Figure 7:
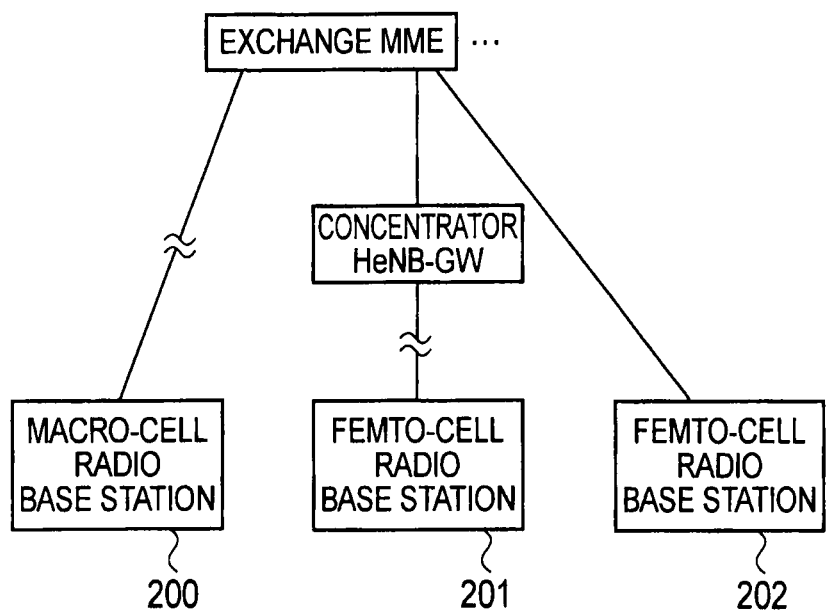
[FIG. 7]

Secondly, as shown in FIG. 7, the mobile communication system according to the present embodiment may be so configured that the macro-cell radio base station 200 is managed by an exchange MME, which is a type of a network device, and the femto-cell radio base stations 201, 202 are managed by a concentrator HNB-GW, which is a type of a network device.

Here, the femto-cell radio base stations 201, 202 may be managed by the exchange MME instead of the concentrator HNB-GW.

Figure 8:
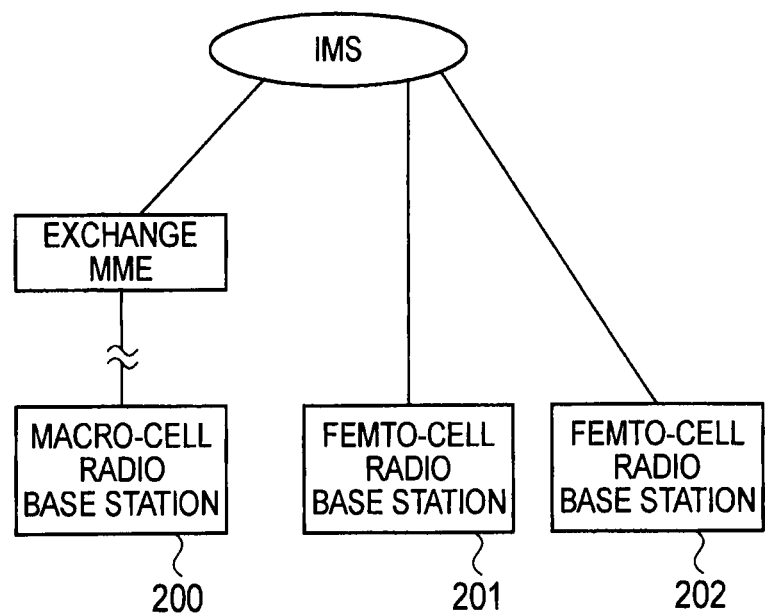
[FIG. 8]

Thirdly, as shown in FIG. 8, the mobile communication system according to the present embodiment may be so configured that the macro-cell radio base station 200 is managed by an exchange MME (or radio network controller RNC), which is a type of a network device, and the femto-cell radio base stations 201, 202 are managed by an IMS (IP Multimedia Subsystem), which is a type of a network device.

The features of the embodiment of the present invention can be described as follows.

A first aspect of the present embodiment is summarized as a mobile communication method comprising: a step A of determining to change a manager of a radio base station from a first network device to a second network device; a step B of transmitting a reset request to the radio base station; a step C of performing a reset operation by the radio base station in response to the reset request; a step D of notifying the radio base station of address information of the second network device; and a step E of establishing connection with the second network device by the radio base station using the notified address information of the second network device, wherein in the step C, the radio base station gradually lowers transmission power for broadcast information upon receiving the reset request and performs the reset operation after the transmission power for the broadcast information is lowered to a predetermined value if the radio base station is a first radio base station (macro-cell radio base station 200), and in the step C, the radio base station performs the reset operation upon receiving the reset request if the radio base station is a second radio base station (femto-cell radio base stations 201, 202).

In the first aspect of the present embodiment, in the step A, when the second network device is newly installed in a service area of the first network device, a radio base station of which the manager is to be changed to the second network device may be determined in accordance with a service area of the second network device and an installed position of each radio base station managed by the first network device.

In the first aspect of the present embodiment, in the step A, a radio base station of which the manager is to be changed to the second network device may be determined further depending on whether the radio base station is the first radio base station or the second radio base station.

In the first aspect of the present embodiment, the mobile communication method may include the step of notifying a server device of information on the radio base station of which the manager is to be changed to the second network device, and in the step D, the server device may notify the radio base station of the address information of the second network device in accordance with information on the radio base station included in an address resolution request transmitted from the radio base station.

A second aspect of the present embodiment is summarized as a server device (PnP server 600) comprising: a determination unit 12 configured to determine a radio base station of which the manager is to be changed to a second network device in accordance with a service area of the second network device, and an installed position of each radio base station managed by a first network device when the second network device is newly installed in a service area of the first network device; and a transmission unit 13 configured to transmit a reset request to the radio base station.

In the second aspect of the present embodiment, in the server device, the determination unit 12 may be further configured to determine a radio base station of which the manager is to be changed to the second network device depending on whether the radio base station is a first radio base station or a second radio base station, the first radio base station may be a radio base station configured to gradually lower transmission power for broadcast information upon receiving the reset request and perform a reset operation after the transmission power for the broadcast information is lowered to a predetermined value, and the second radio base station may be a radio base station configured to perform the reset operation upon receiving the reset request.

(Modifications)

Note that the operation of the above-mentioned network device 100 through 104, the macro-cell radio base station 200, the femto-cell radio base stations 201, 202 and the PnP server 600 may be implemented by means of hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Moreover, the storage medium may be integrated into the processor. Additionally, the storage medium and the processor may be provided in an ASIC. The ASIC may be provided in the network device 100 through 104, the macro-cell radio base station 200, the femto-cell radio base stations 201, 202 and the PnP server 600. Alternatively, the storage medium and the processor may be provided in the network device 100 through 104, the macro-cell radio base station 200, the femto-cell radio base stations 201, 202 and the PnP server 600 as a discrete component.

Hereinabove, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
   step A of determining to change a manager of a radio base station from a first network device to a second network device;
   step B of transmitting a reset request to the radio base station;
   step C of performing a reset operation by the radio base station in response to the reset request;
   step D of notifying the radio base station of address information of the second network device; and
   step E of establishing connection with the second network device by the radio base station using the notified address information of the second network device, wherein
   in the step C, the radio base station lowers transmission power for broadcast information upon receiving the reset request and performs the reset operation after the transmission power for the broadcast information is lowered to a predetermined value if the radio base station is a first radio base station, and in the step C, the radio base station performs the reset operation upon receiving the reset request if the radio base station is a second radio base station.

2. The mobile communication method according to claim 1, wherein in the step A, when the second network device is newly installed in a service area of the first network device, a radio base station of which the manager is to be changed to the second network device is determined in accordance with a service area of the second network device and an installed position of each radio base station managed by the first network device.

3. The mobile communication method according to claim 1, wherein in the step A, a radio base station of which the manager is to be changed to the second network device is determined further depending on whether the radio base station is the first radio base station or the second radio base station.

4. The mobile communication method according to claim 1 further comprising the step of notifying a server device of information on the radio base station of which the manager is to be changed to the second network device, wherein in the step D, the server device notifies the radio base station of the address information of the second network device in accordance with information on the radio base station included in an address resolution request transmitted from the radio base station.

5. A server device comprising: a determination unit configured to determine a radio base station of which a manager is to be changed to a second network device in accordance with a service area of the second network device, and an installed position of the radio base station managed by a first network device when the second network device is newly installed in a service area of the first network device; and a transmission unit configured to transmit a reset request to the radio base station for establishing a connection with the second network device;

wherein the determination unit is further configured to determine the radio base station of which the manager is to be changed to the second network device, depending on whether the radio base station is a first radio base station or a second radio base station, the first radio base station is a radio base station configured to lower transmission power for broadcast information upon receiving the reset request and perform a reset operation after the transmission power for the broadcast information is lowered to a predetermined value.

6. The server device according to claim 5, wherein the second radio base station is a radio base station configured to perform the reset operation upon receiving the reset request.

* * * * *